Dec. 28, 1965 L. STASCHOVER ET AL 3,226,560

REGULATION CIRCUIT EMPLOYING MEANS TO MAINTAIN SUM OF CURRENTS IN TWO CONTROL DEVICES CONSTANT

Filed Oct. 27, 1961 2 Sheets-Sheet 1

INVENTOR.
LEO STASCHOVER
MARTIN A. WEINER
BY Alfred W. Barber
ATTORNEY

INVENTOR.
LEO STASCHOVER
MARTIN A. WEINER
BY Alfred W. Barber
ATTORNEY 3,226,560

REGULATION CIRCUIT EMPLOYING MEANS TO MAINTAIN SUM OF CURRENTS IN TWO CONTROL DEVICES CONSTANT

Leo Staschover, Syosset, and Martin A. Weiner, Bronx, N.Y., assignors to North Hills Electronics, Inc., Glen Cove, N.Y., a corporation of New York Filed Oct. 27, 1961, Ser. No. 148,244
11 Claims. (Cl. 307—60)

The present invention concerns regulated current source and, in particular, current sources capable of providing regulated direct current, modulated direct current and alternating current.

Constant current generators have found increasing application in recent years because of test requirements for semiconductors, magnetic components, and other current-sensitive devices. High precision current sources have become necessary because of the increasing need for high accuracy measurements and determination of component reliability.

The usual D.-C. constant current generator consists of a D.-C. reference, a sampling resistor sampling the load current and a comparison amplifier which compares the reference voltage with the voltage drop across the sampling resistor. The output of the amplifier then controls a power source which feeds the series combination of sampling resistor and external load.

It has been found according to the present invention that a D.-C. constant current generator may be converted into an A.-C. constant current source by replacing the D.-C. reference by an A.-C. command signal which the current then follows instantaneously. Under these conditions, the amplifying system must have sufficient output capability to drive full load current through the external load at the frequency of the applied reference signal. This is not always a simple matter since the stabilizing networks required to limit the bandwidth of the amplifying system to assure stability also limit the available output swing of an amplifier stage. Stabilizing networks must, therefore, be placed in the low level stages of the amplifier system so that the required dynamic range is assured in the high level output sections.

The voltage drop across an accurate current sensing device in series with the load is compared to an accurate reference voltage. The difference between the voltages, called an error voltage, is held to a negligibly small value by a high gain feedback loop. The accuracy of a constant current system of this type is determined by the accuracy of the reference voltage and current sensing device, and the magnitude of the error signal which is a function of the loop gain of the feedback system and the drifts within the system.

System stability with a wide range of resistive and reactive loads is achieved with a 6 db/octave slope of the open loop amplitude frequency response characteristic. Feedback type shaping networks are used in the low-level stages of the error amplifier providing low noise and wide dynamic range in the output.

Thus, briefly, the current regulator of the present invention comprises a positive and a negative voltage source connected in series across two tubes also connected in series. The load and a current sensing resistor in series are connected between the junction between the two voltage sources and the junction between the two tubes. The sum of the currents in the two tubes is maintained substantially constant by a differential control amplifier. The current in the load is made to follow a reference voltage and/or modulating voltage by comparing the voltage drop across the current sensing resistor with the reference and/or modulating voltage and amplifying the difference in an amplifier of sufficiently high gain that when the difference voltage is applied to the control grid of one of the tubes, compared voltages are maintained equal to within a predetermined amount and the load current is made to faithfully reproduce the reference voltage and/or modulating voltage. An additional function is performed in a D.-C. follower amplifier which relays the error signal from error amplifier to tube grid and at the same time transforms the D.-C. level to a suitable value at the tube grid. Since the error amplifier gain is high and the feedback path is essentially from a cathode current drop of the controlled tube to its grid, the circuit may be considered a 100 percent feedback, unity gain cathode follower circuit. This is well known to provide a very low output impedance which is what is desired for the load.

An important feature of the present invention is the current control system which efficiently supplies any predetermined current level between the maximum positive value and the maximum negative value. This current control system is in effect an efficient and very low distortion direct current feedback amplifier having an alternating current response well up into the audio frequency range. In one particular embodiment of the present invention, currents up to 150 milliamperes from D.-C. to 6 kc. are provided with D.-C. accuracy of 0.01% of full scale.

Accordingly one object of the present invention is to provide methods of and means for providing accurately controlled current to a load in which the controlled current may be direct current of either positive or negative polarity, modulated direct current, or alternating current.

Another object is to provide these currents with very low distortion.

Still another object is to provide these currents at high efficiency.

These and other objects of the present invention will be apparent from the detailed description of the invention given in connection with the various figures of the drawing.

Figure 1:
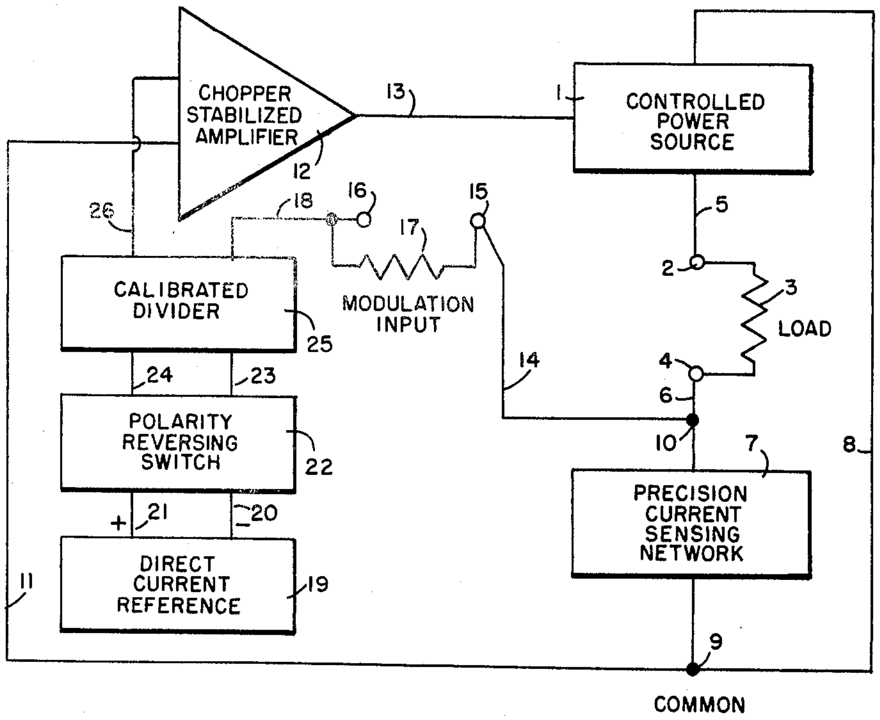
FIG. 1 is a block diagram of one form of the present invention.

In FIG. 1 is shown a controlled power source 1 capable of supplying current in a positive or negative direction over lead 8 with respect to lead 5, modulated direct current of either polarity or alternating current as directed by chopper stabilized amplifier 12 connected to the power source 1 over lead 13. The controlled current is supplied over these leads 5 and 8 to load terminals 2 and 4 across which is connected a load impedance 3 and in series over lead 6 with terminals 9 and 10 across which is connected precision current sensing network 7. The current in load 3 is controlled by applying the difference between the voltage drop due to the load current flowing through network 7 and a reference voltage between 18 and 26 which when applied to the input of amplifier 12 controls the current from power source 1 until this difference approaches zero. The degree and precision of this control depends to a large degree upon the gain, linearity and dynamic range of amplifier 12 and the response of controlled power source 1. The reference voltage may be established in several ways. To provide pure D.-C. in the load a source of direct current reference 19 is connected over leads 20 and 21 to polarity reversing switch 22 which is connected over leads 23 and 24 to calibrated divider 25 which in turn is connected over lead 26 to the input of amplifier 12 and over lead 18 to terminal 16 of modulation input 15–16 bridged by circuit completing resistor 17 and over lead 14 to the high terminal 10 of network 7. The common circuit to amlifier 12 is connected from terminal 9 by lead 11.

In operation, amplifier 12 feeds a control signal to controlled power source 1 in such a way as to adjust the load current so that the voltage drop across current sensing network 7 is equal to the voltage drop across the output of calibrated divider 25 plus the voltage applied between terminals 15 and 16. If no modulating voltage is applied between terminals 15 and 16, the system will provide accurately known direct current through load 3 in accordance with the setting of divider 25. Current of either polarity is provided by switching polarity reversing switch 22 since source 1 is capable of supplying current of either polarity to load 3. If a variable voltage is applied between terminals 15 and 16, a modulated direct current is provided in the load since amplifier 12 responds from D.-C. through low and middle audio frequency range. Since the load current may be of either polarity and may be variable, if divider 25 is turned to zero output and alternating input voltage is applied across terminals 15 and 16, alternating current is provided to load 3 which accurately follows the instantaneous values of the input voltage.

Figure 3:
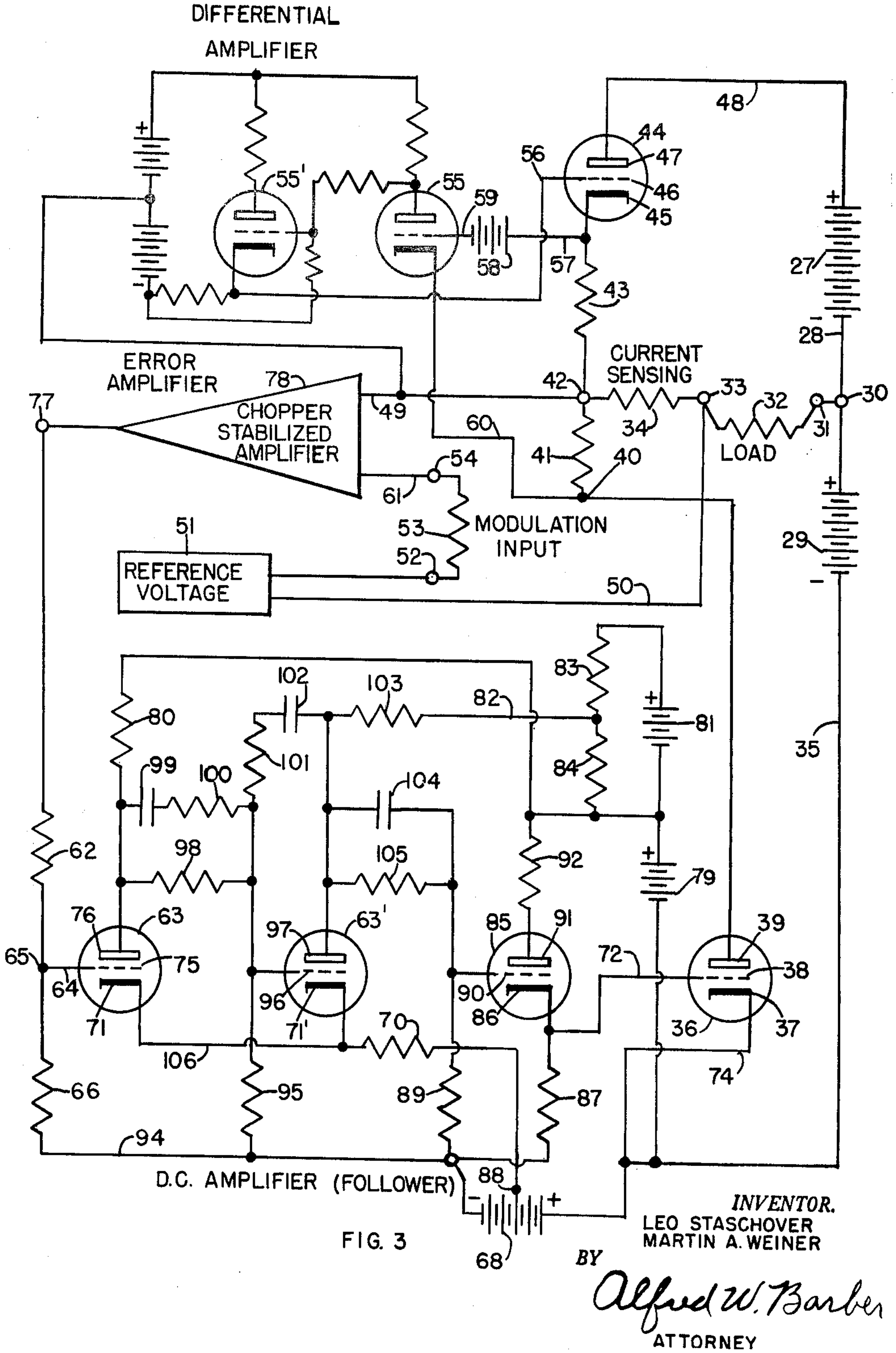
FIG. 3 is a schematic of a preferred form of the present invention.

FIG. 3 shows circuit details of a preferred form of controlled power source suitable for use in a system according to the present invention. Tubes 36 and 44 together with the two voltage sources 29 and 27 provide means for passing controlled current in either direction through load 32 in series with current sensing resistor 34. Tube 36 includes cathode 37 heated by conventional means, not shown, control grid 38 and plate 39. Tube 36 is connected in a series circuit starting at common point 42 passing through current sensing resistor 34, load 32 connected between terminals 31 and 33, to point 30, through a suitable voltage source such as battery 29, over leads 35 and 74 to cathode 37, through tube 36 to plate 39 and through resistor 41 back to the starting point 42. It will be seen that current may pass through tube 36 in such a direction as to make terminal 31 of load 32 positive with respect to terminal 33. Tube 44 includes cathode 45 heated by suitable means, not shown, control grid 46 and plate 47. Tube 44 is included in a series circuit starting at point 42, passing through resistor 43 to cathode 45, through tube 44 to plate 47, over lead 48 to the positive end of a suitable voltage source such as battery 27, over lead 28 to point 30, through load 32 and current sensing resistor 34 back to point 42. It will be seen that current passed by tube 44 in a direction to make terminal 31 end of resistor 32 negative with respect to terminal 33. Now by controlling the current passed by tubes 36 and 44 the current and its direction in load 32 may be controlled.

The tube currents are controlled in two ways. First, the sum of the two tube currents is kept constant, and second, the current of one tube is controlled to maintain the difference between the drop in the current sensing resistor and the control or reference voltage at substantially zero. If the sum of the currents of the two tubes is kept constant, the load current can be controlled in any desired manner within its range with a high degree of fidelity and with good efficiency. For example, two tubes operated in a class B circuit would suffer from considerable cross-over distortion not present with the circuit of the present invention. The control voltage is applied to one tube for controlling the load current.

The circuit for maintaining the sum of the two tube currents constant includes a direct current amplifier 55, 55' which may conveniently be a direct current amplifier with cathode follower output connected over lead 56 to grid 46 and its input over leads 59 and 60 consisting of the drops through resistors 41 and 43, in series with tubes 36 and 44, and reference 58 connected over lead 57 and to point 40. If the currents in the two tubes are equal, and resistors 41 and 43 are equal, the sum of the voltage drops through resistors 41 and 43 subtracted from the voltage of battery 58 will provide an input direct current to amplifier 55 which produces an output voltage to grid 46 such that tube 44 will pass the current. Now, if the current in tube 36 is changed, the input voltage to amplifier 55 will change causing a change in the voltage on grid 46 in a direction and a magnitude to change the current in tube 44 equally and oppositely to maintain the sum of the two tube currents substantially constant.

Figure 2:
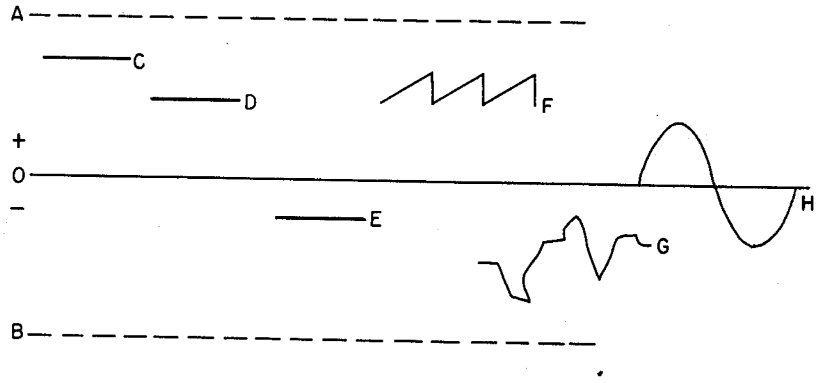
FIG. 2 is a representation of possibe output current forms provided by the present invention.

The second control is applied to grid 38 and is derived from the current sensing resistor 34 and the reference voltage 51, and/or the modulating voltage applied to terminals 52–54 and across resistor 53. FIG. 2 shows how the load current may have any value between positive A and negative B such as C, D or E or may vary as shown at F, G and H. This second control results when the difference between the drop in current sensing resistor 34 and the reference voltage 51 and/or the modulation voltage over leads 49 and 61 is applied to the high gain chopper stabilized amplifier 78 the output of which is coupled through direct current amplifier tubes 63, 63' and 85 to grid 38. Chopper stabilized amplifier 78 is a conventional high gain chopper stabilized amplifier with its gain cut 6 db per octave above a predetermined frequency for stability reasons and having a wide dynamic range with low distortion output provided by means of degenerative feed-back. This circuit will cause the output at point 77 and across resistors 62 and 66 to faithfully follow the reference and/or modulating voltage referred to above.

The purpose of amplifier stages 63, 63' and 85 is to relay the error amplifier output to grid 38 in order to control accurately the current in the load 32 and at the same time to make a D.C. level translation from point 77 to grid 38. This is necessary since grid 38 is at a D.C. level which is considerably negative with respect to point 42 it being the voltage of source 29 less the drop in load 32. This relaying of the signal is accomplished by applying the portion of the output of error amplifier 78 existing at point 65 over lead 64 to grid 75. Tube 63 includes cathode 71 heated by conventional means not shown, control grid 75 and plate 76. Tube 63' includes cathode 71' heated by conventional means not shown, control grid 96 and plate 97. Tube 85 includes cathode 86 heated by conventional means not shown, control grid 90 and plate 91. Cathodes 71 and 71' are returned through common resistor 70 to a negative voltage point 88 on bias source 68 the positive side of which is connected to cathode 37. Cathode 86 is returned through resistor 87 to the negative end of bias source 68. Plate 76 is connected through load resistor 80 to the junction between bias sources 79 and 81 which in actual practice may be sources 29 and 27. The amplified signals at plate 76 are applied to a divider consisting of resistors 98 and 95 in series and the signal at the junction of the divider is applied to grid 96. Both signal and the proper bias are applied to grid 96 in this way. Plate 97 is returned through load resistor 103 and over lead 82 to a voltage from bias source 81 divided by resistors 83 and 84 connected there across. The signal at plate 97 is applied to grid 90 over a divider 105–89 supplying proper bias at the same time. Plate 91 is returned to the positive end of bias source 79 through load resistor 92. The cathode follower output of tube 85 is applied to tube 36 by connecting cathode 86 to grid 38 over lead 72. It will be seen that with current flowing in plate resistor 92 to the positive end of bias source 79 (which for D.C. is equivalent to the voltage at point 30) and cathode current flowing through resistor 87 to the negative end of bias source 68 that the D.C. level at cathode 86 will be somewhere in mid-range and not far different from the D.C. level at cathode 37. In this way the error signal at point 77 has been relayed to grid 38 and at the same time the D.C. level has been transformed to the proper value for grid 38. The capacitor 104, capacitor-resistor combination 102–101 and capacitor-resistor combination 100–99 are provided as suitable feed-back and stabilizing impedances to maintain desired frequency response and stability in the D.C. amplifier.

While vacuum tubes have been shown in the drawings, it will be evident that transistors can be substituted for some or all of the tubes.

While only a single embodiment of the present invention has been shown and described, many modifications will be apparent to those skilled in the art and within the spirit and scope of the present invention as set forth in particular in the appended claims.

What is claimed is:

1. In a regulated current system the combination of, two voltage sources connected in series, at least two signal responsive control devices connected in series across said series connected voltage sources, load connecting means and a current sensing means connected in series between the junction between said voltage sources and the junction between said control devices, means for keeping the sum of the currents in said control devices substantially constant and load current control means including means for comparing the drop across said current sensing means with a reference voltage to provide an error signal and feed-back means including an amplifier coupled to one of said signal responsive control devices for maintaining said error signal substantially zero.

2. A regulated current system as set forth in claim 1 in which said feed-back means includes a high gain chopper stabilized amplifier.

3. A regulated current system as set forth in claim 1 in which means for keeping said sum of the current in said control devices substantially constant includes a differential amplifier.

4. A regulated current system as set forth in claim 1 in which said two voltage sources present terminals of opposite polarity to said two signal responsive devices.

5. A regulated current system as set forth in claim 1 in which said signal responsive control devices are space charge control devices.

6. A regulated current system as set forth in claim 1 in which said feed-back means is stabilized by means for rolling off the gain at a rate of substantially 6 db per octave for frequencies above a predetermined frequency.

7. A regulated current system as set forth in claim 1 in which said feed-back means includes D.C. level changing circuits.

8. In a current regulating system, the combination of, two sources of voltage connected in series, two signal responsive current control devices connected in series and in shunt with said voltage sources, load terminals and current sensing means in series bridged from a point intermediate of said voltage sources and a point intermediate of said current control devices so as to receive the difference current between the currents flowing through said current control devices, means for maintaining the sum of the currents flowing in said current control devices substantially constant, means for comparing the voltage drop across said current sensing resistor with a reference voltage to develop an error voltage, means for amplifying said error voltage, and means for coupling said amplified error voltage to one of said signal responsive current control devices in such polarity as to cause said current control device to tend to reduce the amplitude of said error voltage.

9. A current regulating system as set forth in claim 8 wherein said amplifying means comprises a high gain chopper amplifier with roll-off means in the low level stages thereof.

10. A current regulating system as set forth in claim 8 wherein said current sum maintaining means includes a differential amplifier coupled to said current control devices.

11. A current regulating system as set forth in claim 8 wherein said reference voltage includes at least a component of alternating current.

References Cited by the Examiner

UNITED STATES PATENTS

| | | | |
|---|---|---|---|
| 2,701,858 | 2/1955 | Bakeman et al. | 323—66 |
| 2,797,383 | 6/1957 | Wolf | 323—22 |
| 2,912,638 | 11/1959 | McNamee | 323—4 |
| 3,135,910 | 6/1964 | Hamilton | 307—52 |

LLOYD McCOLLUM, *Primary Examiner.*